US008261281B2

(12) United States Patent
Kashyap

(10) Patent No.: US 8,261,281 B2
(45) Date of Patent: *Sep. 4, 2012

(54) OPTIMIZING ALLOCATION OF RESOURCES ON PARTITIONS OF A DATA PROCESSING SYSTEM

(75) Inventor: Sujatha Kashyap, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 978 days.

This patent is subject to a terminal disclaimer.

(21) Appl. No.: 12/057,718

(22) Filed: Mar. 28, 2008

(65) Prior Publication Data

US 2008/0184253 A1     Jul. 31, 2008

Related U.S. Application Data

(63) Continuation of application No. 11/335,895, filed on Jan. 19, 2006, now Pat. No. 7,945,913.

(51) Int. Cl.
*G06F 9/46* (2006.01)
*G06F 15/173* (2006.01)

(52) U.S. Cl. ........................ 718/105; 718/104; 709/226

(58) Field of Classification Search ........................ None
See application file for complete search history.

(56) References Cited

U.S. PATENT DOCUMENTS

| 5,408,658 | A | | 4/1995 | Rechtschaffen et al. | |
|---|---|---|---|---|---|
| 5,828,880 | A | * | 10/1998 | Hanko | 718/106 |
| 6,523,059 | B1 | * | 2/2003 | Schmidt | 718/100 |
| 6,697,834 | B1 | * | 2/2004 | Dice | 718/102 |
| 6,957,435 | B2 | * | 10/2005 | Armstrong et al. | 718/104 |
| 6,965,961 | B1 | * | 11/2005 | Scott | 710/310 |
| 7,051,330 | B1 | * | 5/2006 | Kaler et al. | 718/106 |
| 7,299,468 | B2 | * | 11/2007 | Casey et al. | 718/104 |
| 7,424,712 | B1 | * | 9/2008 | Sistare et al. | 718/102 |
| 7,657,675 | B1 | * | 2/2010 | Hoffman et al. | 710/60 |
| 7,748,005 | B2 | * | 6/2010 | Romero et al. | 718/104 |
| 7,752,624 | B2 | * | 7/2010 | Crawford et al. | 718/104 |
| 2003/0037092 | A1 | * | 2/2003 | McCarthy et al. | 709/104 |
| 2005/0044228 | A1 | * | 2/2005 | Birkestrand et al. | 709/226 |
| 2005/0240932 | A1 | * | 10/2005 | Billau et al. | 718/104 |
| 2005/0262507 | A1 | * | 11/2005 | Langen et al. | 718/100 |
| 2006/0218557 | A1 | * | 9/2006 | Garthwaite et al. | 718/105 |
| 2007/0006232 | A1 | * | 1/2007 | Bliss | 718/100 |

OTHER PUBLICATIONS

Davidson et al., Dynamic Addition Deletion of a Parallel CPU, IBM Technical Disclosure Bulletin, Nov. 1977, pp. 2191-2192.

(Continued)

*Primary Examiner* — Emerson Puente
*Assistant Examiner* — Adam Lee
(74) *Attorney, Agent, or Firm* — Yudell Isidore Ng Russell PLLC

(57) ABSTRACT

A method, system and computer program product for optimizing allocation of resources to partitions of a data processing system are disclosed. The method includes creating a first virtual central processing unit and a second virtual central processing unit, wherein at least one of the set of the first virtual processing unit and the second virtual processing unit spans across a first physical processing unit and a second physical processing unit. One or more resources from the first and second virtual central processing units are allocated to a first partition and a second partition. Whether one or more processes running on the first partition can utilize additional resources is determined. One or more resources from the first virtual central processing unit and resources from the second virtual central processing unit are reallocated to the first partition, wherein at least one of the resources was previously allocated to the second partition.

14 Claims, 5 Drawing Sheets

OTHER PUBLICATIONS

Kashyap et al., Dynamic Memory Management of Unallocated Memory in a Logical Partitioned Data Processing System, U.S. Appl. No. 10/845,549, filed May 13, 2004.

O'Brien et al., Method and System for Exploiting Parallelism on a Heterogeneous Multiprocessor Computer System, U.S. Appl. No. 11/002,555, filed Dec. 2, 2004.

* cited by examiner

OPTIMIZING ALLOCATION OF RESOURCES ON PARTITIONS OF A DATA PROCESSING SYSTEM

The present application is a continuation of U.S. patent application Ser. No. 11/335,895, filed on Jan. 19, 2006 now U.S. Pat. No. 7,945,913, entitled "Method, System and Computer Program Product for Optimizing Allocation of Resources on Partitions of a Data Processing System". Applicants claim benefit of priority under 35 U.S.C. §120 to U.S. patent application Ser. No. 11/335,895, which is incorporated by reference herein in its entirety and for all purposes.

BACKGROUND OF THE INVENTION

1. Technical Field

The present invention relates in general to sharing resources in data processing systems and in particular to reallocating resources between logical partitions of a data processing system. Still more particularly, the present invention relates to a system, method and computer program product for optimizing allocation of resources to partitions of a data processing system.

2. Description of the Related Art

Logical partitioning (LPAR) of a data processing system permits several concurrent instances of one or more operating systems on a single processor, thereby providing users with the ability to split a single physical data processing system into several independent logical data processing systems capable of running applications in multiple, independent environments simultaneously. For example, logical partitioning makes it possible for a user to run a single application using different sets of data on separate partitions, as if the application was running independently on separate physical systems.

Partitioning has evolved from a predominantly physical scheme, based on hardware boundaries, to one that allows for virtual and shared resources, with load balancing. The factors that have driven partitioning have persisted from the first partitioned mainframes to the modern server of today. Logical partitioning is achieved by distributing the resources of a single system to create multiple, independent logical systems within the same physical system. The resulting logical structure consists of a primary partition and one or more secondary partitions.

The ability of a partitioned data processing system both to create and to close or dissolve concurrent instances of one or more operating systems on a single processor creates numerous technological challenges with regard to the migration of resources and processes from one partition to another. Uncapped sub-processor partitions (i.e., partitions for which resource limitations are not enforced) allow for the exploitation of idle time on a system by 'expanding' the partition to use more processing cycles when available. Existing embodiments of uncapped partitions, however, limit the amount of expansion of the partition to the total number of virtual CPUs allotted to that partition. This limiting action is a burdensome limit imposed on the parallelization of jobs in the partition.

What is needed is a system, method and computer program product for optimizing allocation of resources to partitions of a data processing system.

SUMMARY OF THE INVENTION

A method, system and computer program product for optimizing allocation of resources to partitions of a data processing system are disclosed. The method includes creating a first virtual central processing unit and a second virtual central processing unit, wherein at least one of the set of the first virtual processing unit and the second virtual processing spans across a first physical processing unit and a second physical processing unit. One or more resources from the first and second virtual central processing units are allocated to a first partition and a second partition. Whether one or more processes running on the first partition can utilize additional resources is determined. One or more resources from the first virtual central processing unit and resources from the second virtual central processing unit are reallocated to the first partition, wherein at least one of the resources was previously allocated the second partition.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed descriptions of an illustrative embodiment when read in conjunction with the accompanying drawings, wherein:

DETAILED DESCRIPTION OF THE PREFERRED EMBODIMENT

Figure 1:
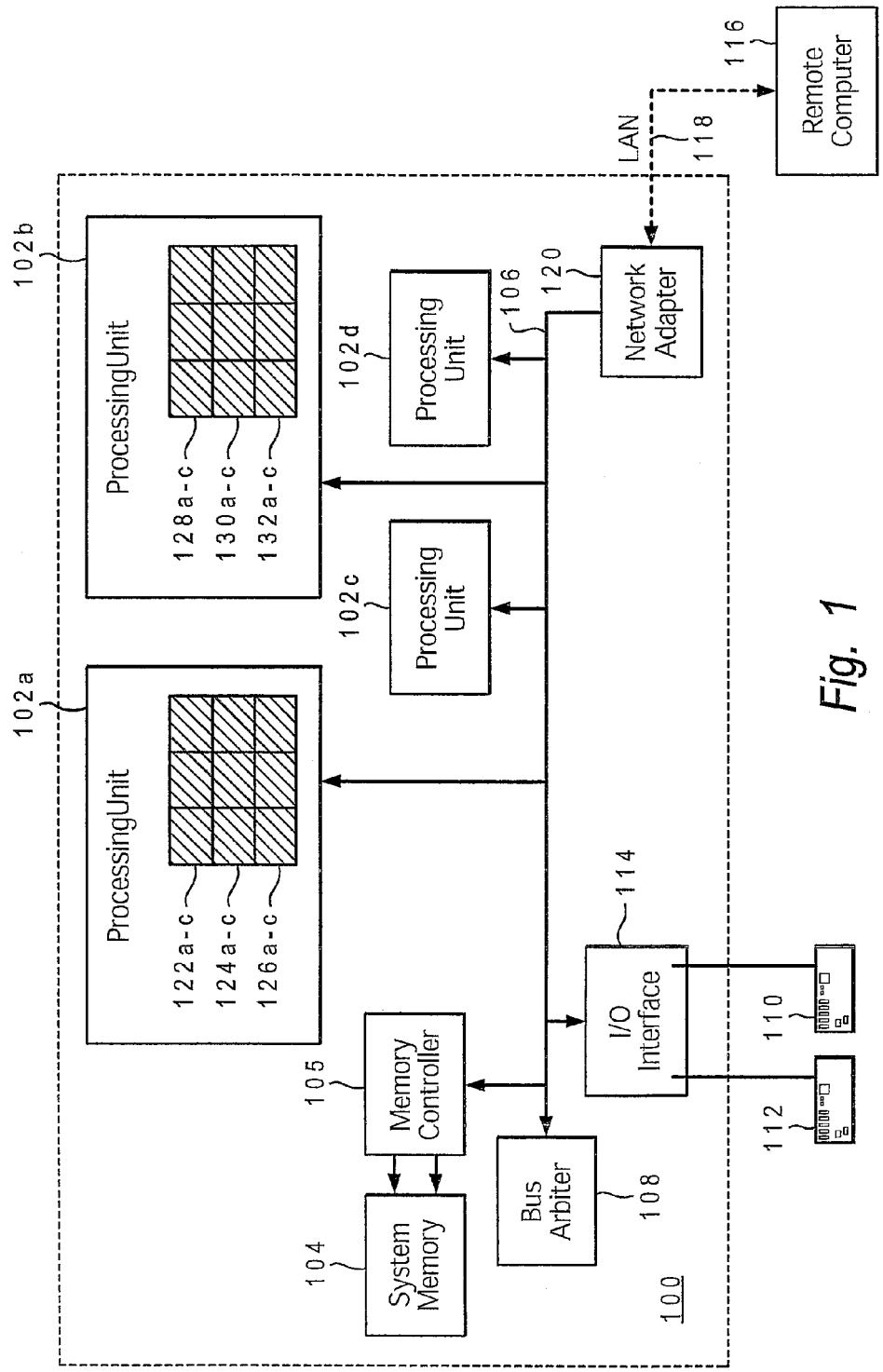
FIG. 1 illustrates a block diagram of a data processing system in which a preferred embodiment of the system, method and computer program product for optimizing allocation of resources to partitions of a data processing system are implemented.

With reference now to figures and in particular with reference to FIG. 1, there is depicted a data processing system 100 that may be utilized to implement the method, system and computer program product of the present invention for optimizing allocation of resources to partitions of a data processing system. For discussion purposes, the data processing system is described as having features common to a server computer. However, as used herein, the term "data processing system," is intended to include any type of computing device or machine that is capable of receiving, storing and running a software product, including not only computer systems, but also devices such as communication devices (e.g., routers, switches, pagers, telephones, electronic books, electronic magazines and newspapers, etc.) and personal and home consumer devices (e.g., handheld computers, Web-enabled televisions, home automation systems, multimedia viewing systems, etc.).

FIG. 1 and the following discussion are intended to provide a brief, general description of an exemplary data processing system adapted to implement the present invention. While parts of the invention will be described in the general context of instructions residing on hardware within a server computer, those skilled in the art will recognize that the invention also may be implemented in a combination of program modules running in an operating system. Generally, program modules include routines, programs, components and data structures, which perform particular tasks or implement particular abstract data types. The invention may also be practiced in distributed computing environments where tasks are performed by remote processing devices that are linked through a communications network. In a distributed computing environment, program modules may be located in both local and remote memory storage devices.

Data processing system 100 includes one or more processing units 102a-102d containing discrete processors 122a-132c, a system memory 104 coupled to a memory controller 105, and a system interconnect fabric 106 that couples memory controller 105 to processing unit(s) 102 and other components of data processing system 100. Discrete processors 122a-126c are located on processing unit 102a. Discrete processors 128a-132c are located on processing unit 102b. Commands on system interconnect fabric 106 are communicated to various system components under the control of bus arbiter 108.

Data processing system 100 further includes fixed storage media, such as a first hard disk drive 110 and a second hard disk drive 112. First hard disk drive 110 and second hard disk drive 112 are communicatively coupled to system interconnect fabric 106 by an input-output (I/O) interface 114. First hard disk drive 110 and second hard disk drive 112 provide nonvolatile storage for data processing system 100. Although the description of computer-readable media above refers to a hard disk, it should be appreciated by those skilled in the art that other types of media which are readable by a computer, such as a removable magnetic disks, CD-ROM disks, magnetic cassettes, flash memory cards, digital video disks, Bernoulli cartridges, and other later-developed hardware, may also be used in the exemplary computer operating environment.

Data processing system 100 may operate in a networked environment using logical connections to one or more remote computers, such as remote computer 116. Remote computer 116 may be a server, a router, a peer device or other common network node, and typically includes many or all of the elements described relative to data processing system 100. In a networked environment, program modules employed by to data processing system 100, or portions thereof, may be stored in a remote memory storage device, such as remote computer 116. The logical connections depicted in FIG. 1 include connections over a local area network (LAN) 118, but, in alternative embodiments, may include a wide area network (WAN).

When used in a LAN networking environment, data processing system 100 is connected to LAN 118 through an input/output interface, such as a network adapter 120. It will be appreciated that the network connections shown are exemplary and other means of establishing a communications link between the computers may be used.

Figure 2:
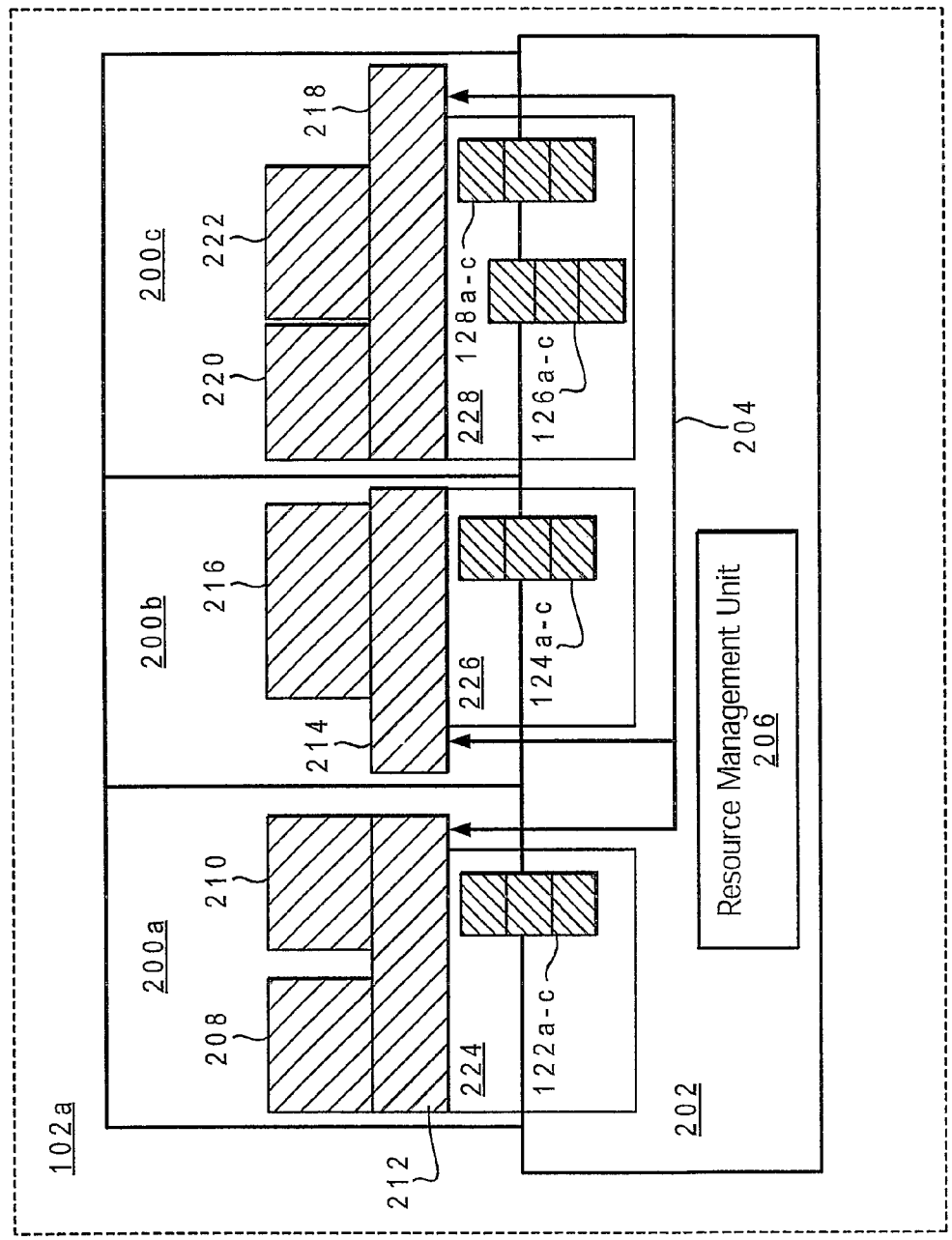
FIG. 2 illustrates a distribution of processing resources of multiple processing units in a logically partitioned system in accordance with a preferred embodiment of the present invention.

Turning now to FIG. 2, a distribution of processing resources of multiple processing units in a logically partitioned system in accordance with a preferred embodiment of the present invention is depicted. Processing unit 102a serves as the primary or 'home' processing unit for three logical partitions 200a-200c supported by four virtual processors 224-230 and a management module 202, such as a hypervisor, for managing interaction between and allocating resources between logical partitions 200a-200c and virtual processors 224-230. A virtual LAN 204, implemented within management module 202, provides communicative interaction between first logical partition 200a supported by first virtual processor 224, second logical partition 200b supported by virtual second processor 226 and third logical partition 200c supported by third virtual processor 228 and fourth virtual processor 230.

Each of logical partitions 200a-200c (LPARs) is a division of a resources of processing unit 102a, and, in a preferred embodiment, processing unit 102b, supported by allocations of system memory 104 and storage resources on first hard disk drive 110 and second hard disk drive 112. Both creation of logical partitions 200a-200c and allocation of resources on processing unit 102a, processing unit 102b, and data processing system 100 to logical partitions 200a-200e are controlled by management module 202. Each of logical partitions 200a-200e and its associated set of resources can be operated independently, as an independent computing process with its own operating system instance and applications. The number of logical partitions that can be created depends on the processor model of data processing system 100 and available resources. Typically, partitions are used for different purposes such as database operation or client/server operation or to separate test and production environments. Each partition can communicate with the other partitions (as if the each other partition is in a separate machine) through first virtual LAN 204.

First virtual LAN 204 is an example of virtual Ethernet technology, which enables IP-based communication between logical partitions on the same system. Virtual LAN (VLAN) technology is described by the IEEE 802.IQ standard. VLAN technology logically segments a physical network, such that layer 2 connectivity is restricted to members that belong to the same VLAN. As is further explained below, this separation is achieved by tagging Ethernet packets with VLAN membership information and then restricting delivery to members of a given VLAN.

A resource management unit 206 within management module 202 assigns resources from processing units 102a-102d to partitions 200a-200c. On first partition 200a, a first process 208, a second process 210 and an operating system 212 are running. Operating system 212 is assigned first virtual processor 224, which includes processors 122a-c from processing unit 102b, by resource management unit 206. Second partition 200b runs an operating system 214, which is assigned processors 124a-c in second virtual processor 226 from processing unit 102a by resource management unit 206. Second partition 200b is also running third process 216. Finally, third partition 200c is running an operating system 218, to which resource management unit 206 has assigned (in third virtual processor 228) processors 126a-c from first processing unit 102a as well as processors 128a-c (in fourth virtual processor 230) from second processing unit 102b. Third partition 200c is running a fourth process 220 and a fifth process 222. Alternatively, in place of fourth virtual processor 230, operating system 218 can assign processors 128a-c from processing unit 102b to third virtual processor 228, thereby creating a virtual processor with processors from separate processing units.

On third partition 200c, operating system 218 maintains a count of the number of runnable threads in third partition 200c. When third partition 200c is an uncapped partition and is receiving more processing cycles than its entitlement, a low system-wide load is indicated. When this situation occurs, and the average runqueue depth (i.e total runnable threads/virtual cpus in the partition) on third partition 200c is greater than one, third partition 200c can ascertain whether not fully utilized resources exist on another partition by requesting resource management unit 206 within management module 202 to provide third partition 200c a count of the number of physical cpus on which no work is dispatched (a number referred to hereafter as avail_idle_procs). If avail_idle_procs is greater than the number of virtual cpus in third partition 200c, and the average runqueue depth is greater than one, then third partition 200c can benefit from increased parallelization of jobs. In this case, third partition 200c creates more virtual cpus through a self-generated dynamic reconfiguration request to resource management unit 206 within management module 202.

The number of additional virtual cpus to be created by third partition 200c is given by subtracting from avail_idle_procs the current number of virtual cpus. Existing load balancing algorithms within operating system 218 then spread the load of runnable threads on third partition 200c across more physical cpus, using a load-balancing scheme that aims at utilizing only one thread per physical processor when there are sufficient physical processors available.

When the average runqueue depth of third partition 200c falls below the (enhanced) number of virtual cpus (vcpus), the additional vcpus can be removed by another dynamic reconfiguration request. When the system load increases, so that the additional physical processors being used by the uncapped third partition 200c are no longer idle, that is, they are required to satisfy the entitlement of other partitions, then the management unit 206 within management module 202 issues a dynamic reconfiguration request to the uncapped partition, resulting in the removal of the additional processors. This removal can be done incrementally, depending on how many of the erstwhile idle processors need to be reclaimed for other partitions.

A preferred embodiment of the present invention provides the advantage of allowing an uncapped partition to maximize its parallelism when the managed system is lightly loaded, and reverts back to its entitled capacity when the system is fully loaded. The preferred embodiment invention also reduces the resource contention between threads whenever possible.

A dispatcher within operating system 218 maintains metrics about the average runqueue depth, which are available to load balancing algorithms. Also, management unit 206 within management module 202 maintains information about the number of idle processors in the system. During periodic load balancing, third partition 200c queries the dispatcher within operating system 218 determines whether the managed system is lightly loaded. Light loading is indicated by whether the partition has been receiving more cycles than its entitlement. In the case of light loading, operating system 218 requests the avail_idle_procs count from management module 202, and initiates a dynamic reconfiguration request as described above.

To avoid a hysteresis effect, a "stabilizing delay" may be introduced. When the load balancer within operating system 218 is first invoked, the load balancer within operating system 218 checks to see whether the managed system is lightly loaded. If so, then the load balancer within operating system 218 sets a light-load bit within system memory 104. The load balancer within operating system 218 also checks to see if its average run queue depth is greater than 1. If so, the load balancer within operating system 218 sets a need-more-cpus bit within system memory 104. These bits serve as history bits for the next invocation of the load balancer. When next the load balancer within operating system 218 is invoked, the load balancer within operating system 218 checks if the light-load bit is set, and performs another check to see if the managed system is still lightly loaded. If the load balancer within operating system 218 passes both checks, and the need-more-cpus bit within system memory 104 is set, then the load balancer within operating system 218 checks to see if the partition's average runqueue depth is still greater than 1. If these conditions are also met, then the reconfiguration request is initiated. Additionally, the priority of a task may be reflected by numerical adjustments to the partition's average runqueue depth. Such adjustments enable operating system 218 to determine relative task priorities and assign resources to processes with higher priority.

Figure 3A:
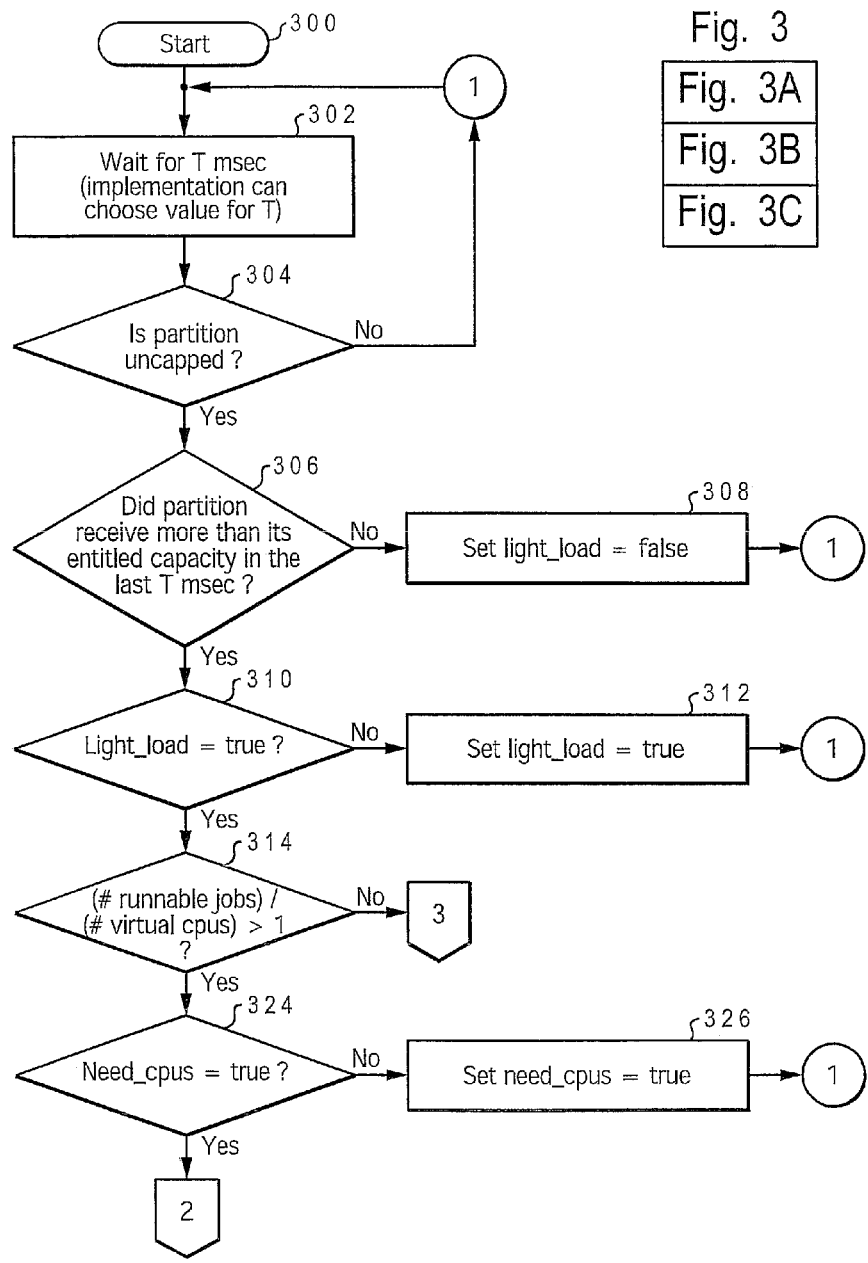
FIG. 3 is a high-level logical flowchart for optimizing allocation of resources to partitions of a data processing system.
Figure 3B:
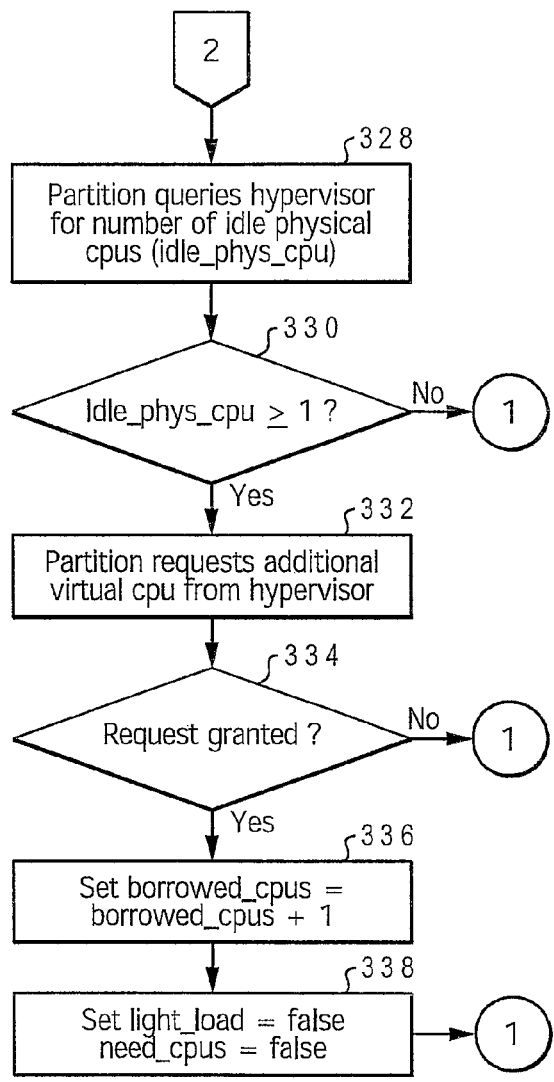
Figure 3C:
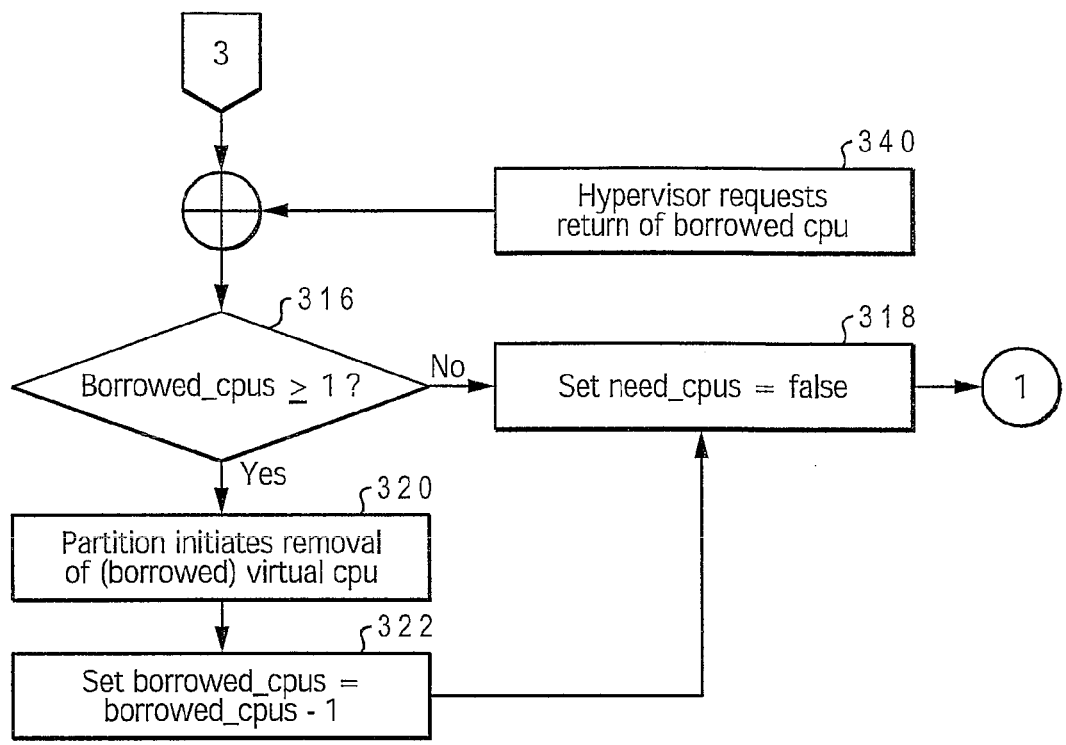

Referring now to FIG. 3, a high level logical flow chart for optimizing allocation of resources to partitions of the data processing system is depicted. The process starts at step 300. The process then moves to step 302, which depicts resource management unit 206 waiting T milliseconds, (wherein a particular implementation can choose a particular value for T through user input or automated analysis). The process next proceeds to step 304. At step 304, resource management unit 206 determines whether a particular partition, such as third partition 200c, is uncapped. If the selected partition is not uncapped, then the process returns to step 302. If the selected partition is uncapped, then the process moves to step 306.

At step 306, resource management unit 206 determines whether the selected partition received more than its entitled capacity in the last T milliseconds. If the selected partition has not received more than its entitled capacity in the last T milliseconds then the process proceeds to step 308, which depicts resource management module setting a light_load bit to false. The process then returns to step 302. If, at step 306, resource management unit 206 determines that the selected partition did receive more than its entitled capacity in the last T milliseconds, then the process next moves to step 310. At step 310, resource management unit 206 determines whether the light_load bit is set to true. If resource management unit 206 determines that the light_load bit is not set to true, then the process progresses to step 312, which depicts resource management module setting the light_load bit to true. The process then returns to step 302. If, at step 310, resource management unit 206 determines that the light_load that is set to true, then the process next moves to step 314.

At step 314, resource management unit 206 computes the ratio of the number of runnable jobs on the selected partition over the number of virtual cpus and determines whether that ratio of the number of runnable jobs on the selected partition over the number of virtual cpus is greater than 1. If resource management unit 206 determines that ratio of the number of runnable jobs on the selected partition over the number of virtual cpus is greater than 1, then the process next proceeds to step 316, which depicts resource management unit 206 determining whether the variable borrowed_cpus, which represents the number of CPUs borrowed by the partition, is greater than or equal to 1. It is noteworthy that step 316 is also reachable at any time when management unit 206 such as a hypervisor, requests the return of a borrowed CPU, a request represented by step 340. If resource management unit 206 determines that the value of the variable borrowed_cpus is not greater than or equal to 1, then the process proceeds to step 318. At step 318, resource management unit 206 sets the need_cpus bit to false. The process then returns to step 302.

Returning to step 316, if resource management unit 206 determines that the variable borrowed_cpus is greater than or equal to 1, then the process moves to step 320, which depicts the partition initiating removal of a borrowed virtual cpu. The process then proceeds to step 322. At step 322, resource management unit 206 decreases the variable borrowed_cpus by 1. The process then returns to step 318, which is described above.

Returning to step 314, if resource management unit 206 determines that the ratio of the number of runnable jobs on the selected partition over the number of virtual cpus is greater than 1, then the process next proceeds to step 324, which depicts resource management unit 206 determining whether the need_cpus bit is set to true. If resource management unit 206 determines that the need_cpus bit is not set to true, then the process next moves to step 326, which depicts resource management unit 206 setting the need_cpus bit to true. The process then returns to step 302. Returning to step 324, if resource management unit 206 determines that the need_cpus bit is set to true, then the process next proceeds to step 328. At step 328 the selected partition queries the management module 206 for the number of idle physical cpus. The process then moves to step 330.

At step 330 management unit 206 determines whether the number of idle physical cpus is greater than 1. If resource management unit 206 determines that the number of idle physical cpus is not greater than 1 then the process returns to step 302, which is described above. If resource management unit 206 determines that the number of idle physical cpus is greater than 1 or equal to 1 then the process moves to step 332. At step 332 the selected partition requests an additional virtual cpu from management unit 206. The process then proceeds to step 334, which depicts management unit 206 determining whether the request in step 332 was granted. If resource management unit 206 determines that the request in step 332 was not granted, then the process returns to step 302, which is described above. If the request in step 332 was granted, then the process next proceeds to step 336. At step 336 management unit 206 increases the variable borrowed_cpus by 1. The process then moves to step 338. At step 338, resource management unit 206 sets a light_load bit to false and sets the needs_cpus bit to false. The process then returns to step 302.

While the invention has been particularly shown as described with reference to a preferred embodiment, it will be understood by those skilled in the art that various changes in form and detail may be made therein without departing from the spirit and scope of the invention. It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communication links.

What is claimed is:

1. A method for optimizing allocation of resources to partitions of a data processing system, said method comprising:
in a data processing having first and second physical processing units and first and second virtual central processing units, wherein at least one of the set of said first and second virtual central processing units spans across the first and second physical processing units, allocating to a first partition and a second partition of the data processing system one or more resources from said first and second virtual central processing units, wherein each of the first and second partitions operates under a respective one of first and second operating systems;
periodically determining whether the first partition is uncapped, and if so, whether the first partition received more than its entitled resource capacity in a given time period;
in response to determining that said first partition is uncapped and received more than its entitled resource capacity in said given time period, setting a light load flag to indicate existence of a lightly loaded partition in the data processing system;
in response to the light load flag being set, determining whether a number of runnable jobs in the uncapped first partition is greater than a number of virtual central processing units in the uncapped first partition; and
if the number of runnable jobs in the uncapped first partition is greater than the number of virtual central processing units in the uncapped first partition and a number of idle physical processing units in the data processing system is at least 1 and a request for an additional virtual central processing unit is received from the first partition:
reallocating to said first partition one or more resources from said first virtual central processing unit and resources from said second virtual central processing unit, wherein at least one of said one or more resources reallocated to the first partition was previously allocated to said second partition;
incrementing a borrowed processor count for the first partition; and
resetting the light load flag.

2. The method of claim 1, further comprising, ascertaining whether said second partition possesses resources not fully utilized.

3. The method of claim 2, wherein said ascertaining whether said second partition possesses resources not fully utilized further comprises calculating whether said second partition possesses resources utilized for one or more processes of a lower priority than one or more processes running on said first partition.

4. The method of claim 3, wherein said reallocating to said first partition one or more resources from said first virtual central processing unit and resources from said second virtual central processing unit further comprises reallocating to a selected process running on said first partition one or more resources previously allocated to said second partition, wherein said resources previously allocated to said second partition were utilized for said one or more processes of said lower priority than said selected process running on said first partition.

5. The method of claim 1, further comprising, in response to a changed condition, reversing said reallocating.

6. A data processing system, comprising:
processing resources including at least a first physical processing unit and a second physical processing unit;
data storage coupled to the processing resources; and
program code stored in the data storage and executable by the processing resources, wherein the program code when executed causes the data processing system to:
create a first virtual central processing unit and a second virtual central processing unit, wherein at least one of the set of said first virtual central processing unit and said second virtual central processing unit spans across a first physical processing unit and a second physical processing unit of the data processing system;
allocate to a first partition and a second partition of the data processing system one or more resources from said first and second virtual central processing units, wherein each of the first and second partitions operates under a respective one of first and second operating systems;
periodically determine whether the first partition is uncapped, and if so, whether the first partition received more than its entitled resource capacity in a given time period;
in response to a determination that the first partition received more than its entitled resource capacity in said given time period, set a light load flag to indicate existence of a lightly loaded partition in the data processing system;

in response to the light load flag being set, determine whether a number of runnable jobs in the uncapped first partition is greater than a number of virtual central processing units in the uncapped first partition; and if the number of runnable jobs in the uncapped first partition is greater than the number of virtual central processing units in the uncapped first partition and a number of idle physical processing units in the data processing system is at least 1 and a request for an additional virtual central processing unit is received from the first partition:

reallocate to said first partition one or more resources from said first virtual central processing unit and resources from said second virtual central processing unit, wherein at least one of said one or more resources reallocated to the first partition was previously allocated to said second partition;

increment a borrowed processor count for the first partition; and reset the light load flag.

7. The data processing system of claim 6, wherein the program code further causes the data processing system to ascertain whether said second partition possesses resources not fully utilized.

8. The data processing system of claim 7, wherein the data processing system ascertains whether the second partition possesses resources not fully utilized by calculating whether said second partition possesses resources utilized for one or more processes of a lower priority than one or more processes running on said first partition.

9. The data processing system of claim 8, wherein the data processing system reallocates resources to the first partition by reallocating to a selected process running on said first partition one or more resources previously allocated to said second partition, wherein said resources previously allocated to said second partition were utilized for said one or more processes of said lower priority than said selected process running on said first partition.

10. The data processing system of claim 6, wherein the program code, in response to a changed condition, causes the data processing system to reverse said reallocating.

11. A program product, comprising:

a non-transitory data storage medium; and program code stored in the data storage medium and executable by a data processing system to cause the data processing system to:

create a first virtual central processing unit and a second virtual central processing unit, wherein at least one of the set of said first virtual central processing unit and said second virtual central processing unit spans across a first physical processing unit and a second physical processing unit of the data processing system;

allocate to a first partition and a second partition of the data processing system one or more resources from said first and second virtual central processing units, wherein each of the first and second partitions operates under a respective one of first and second operating systems;

periodically determine whether the first partition is uncapped, and if so, whether the first partition received more than its entitled resource capacity in a given time period;

in response to a determination that the first partition received more than its entitled resource capacity in said given time period, set a light load flag to indicate existence of a lightly loaded partition in the data processing system;

in response to the light load flag being set, determine whether a number of runnable jobs in the uncapped first partition is greater than a number of virtual central processing units in the uncapped first partition; and if the number of runnable jobs in the uncapped first partition is greater than the number of virtual central processing units in the uncapped first partition and a number of idle physical processing units in the data processing system is at least 1 and a request for an additional virtual central processing unit is received from the first partition:

reallocated to said first partition one or more resources from said first virtual central processing unit and resources from said second virtual central processing unit, wherein at least one of said one or more resources reallocated to the first partition was previously allocated to said second partition;

increment a borrowed processor count for the first partition; and reset the light load flag.

12. The computer program product of claim 11, wherein the program code further causes the data processing system to:

ascertain whether said second partition possesses resources not fully utilized.

13. The computer program product of claim 12, wherein the program code causes the data processing system to ascertain whether said second partition possesses resources not fully utilized by calculating whether said second partition possesses resources utilized for one or more processes of a lower priority than one or more processes running on said first partition.

14. The computer program product of claim 13, wherein the program code causes the data processing system to reallocate resources to said first partition by unit and resources from said second reallocating to a selected process running on said first partition one or more resources previously allocated to said second partition, wherein said resources previously allocated to said second partition were utilized for said one or more processes of said lower priority than said selected process running on said first partition.

* * * * *